United States Patent
Pande et al.

(10) Patent No.: US 11,120,403 B2
(45) Date of Patent: Sep. 14, 2021

(54) CAREER ANALYTICS PLATFORM

(71) Applicant: VMOCK, Inc., Palo Alto, CA (US)

(72) Inventors: Salil Pande, Haryana (IN); Kiran Pande, Haryana (IN)

(73) Assignee: VMOCK, Inc., Palo Alto, CA (US)

( * ) Notice: Subject to any disclaimer, the term of this patent is extended or adjusted under 35 U.S.C. 154(b) by 95 days.

(21) Appl. No.: 15/125,758

(22) PCT Filed: Mar. 16, 2015

(86) PCT No.: PCT/IN2015/000128
§ 371 (c)(1),
(2) Date: Sep. 13, 2016

(87) PCT Pub. No.: WO2015/136555
PCT Pub. Date: Sep. 17, 2015

(65) Prior Publication Data
US 2016/0379170 A1    Dec. 29, 2016

(30) Foreign Application Priority Data
Mar. 14, 2014 (IN) .............................. 765/DEL/2014

(51) Int. Cl.
*G06Q 10/10* (2012.01)
*G06F 16/28* (2019.01)
*G06Q 10/06* (2012.01)

(52) U.S. Cl.
CPC ....... *G06Q 10/1053* (2013.01); *G06F 16/285* (2019.01); *G06Q 10/06* (2013.01)

(58) Field of Classification Search
None
See application file for complete search history.

(56) References Cited

U.S. PATENT DOCUMENTS

| 5,211,564 A | 5/1993 | Martinez et al. |
| 6,584,464 B1 | 6/2003 | Warthen |

(Continued)

FOREIGN PATENT DOCUMENTS

| JP | 2002-215016 A | 7/2002 |
| JP | 2002-288328 A | 10/2002 |

(Continued)

OTHER PUBLICATIONS

Examination Report from the European Patent Office, for International Application No. 15 760 651.8, dated Feb. 1, 2019, pp. 1-9.

(Continued)

*Primary Examiner* — Jan P Mincarelli
(74) *Attorney, Agent, or Firm* — McDonnell Boehnen Hulbert & Berghoff LLP

(57) ABSTRACT

A method and system for assessing a career profile of a candidate is disclosed. The system comprises a database configured to include a plurality of parameters and a plurality of scores respective to each parameter, a parser configured to parse the career profile to identify at least one parameter from the plurality of parameters within the career profile and an analytics engine configured to retrieve a score from the plurality of scores for the at least one parameter identified within the career profile, compute a score of at least one category based on the retrieved score, wherein the at least one category comprises the at least one parameter identified within the career profile, and provide feedback to the candidate on the career profile in accordance with the computed score of the at least one category.

39 Claims, 14 Drawing Sheets

(56) References Cited

U.S. PATENT DOCUMENTS

| | | |
|---|---|---|
| 6,618,734 B1 | 9/2003 | Williams et al. |
| 6,743,024 B1 | 6/2004 | Ivler et al. |
| 7,076,456 B1 | 7/2006 | Rofrano |
| 7,711,573 B1* | 5/2010 | Obeid .............. G06Q 10/1053 |
| | | 705/321 |
| 8,244,551 B1* | 8/2012 | Mund .................... G06Q 10/10 |
| | | 705/1.1 |
| 8,266,068 B1 | 9/2012 | Foss et al. |
| 8,352,406 B2 | 1/2013 | Costa et al. |
| 8,500,450 B1 | 8/2013 | Taylor et al. |
| 10,346,803 B2 | 7/2019 | Pande |
| 2002/0029159 A1 | 3/2002 | Longden |
| 2002/0055870 A1 | 5/2002 | Thomas |
| 2002/0069083 A1 | 6/2002 | Harter et al. |
| 2002/0128894 A1 | 9/2002 | Farenden |
| 2003/0044760 A1 | 3/2003 | Banerjee et al. |
| 2003/0061231 A1 | 3/2003 | Lovegren |
| 2003/0129574 A1 | 7/2003 | Ferriol et al. |
| 2003/0227487 A1 | 12/2003 | Hugh |
| 2004/0008589 A1 | 1/2004 | McMillan et al. |
| 2004/0029092 A1 | 2/2004 | Orr et al. |
| 2004/0093263 A1 | 5/2004 | Doraisamy et al. |
| 2004/0177030 A1 | 9/2004 | Shoham |
| 2004/0186743 A1 | 9/2004 | Cordero, Jr. |
| 2004/0198495 A1 | 10/2004 | Cisneros et al. |
| 2005/0080656 A1* | 4/2005 | Crow ................ G06Q 10/0631 |
| | | 705/7.14 |
| 2005/0209709 A1 | 9/2005 | Bradshaw |
| 2006/0073463 A1 | 4/2006 | Bajer et al. |
| 2006/0084046 A1 | 4/2006 | Brown et al. |
| 2006/0085373 A1 | 4/2006 | Dhillion et al. |
| 2006/0177808 A1 | 8/2006 | Aosawa et al. |
| 2006/0224404 A1 | 10/2006 | Keusseyan |
| 2006/0229902 A1* | 10/2006 | McGovern ............. G06Q 10/06 |
| | | 705/321 |
| 2006/0265269 A1 | 11/2006 | Hyder et al. |
| 2007/0160963 A1 | 7/2007 | Diaz et al. |
| 2007/0160964 A1 | 7/2007 | Albertsson |
| 2007/0203776 A1* | 8/2007 | Austin .................... G06Q 10/00 |
| | | 705/321 |
| 2008/0010219 A1 | 1/2008 | Hargroder |
| 2008/0016054 A1 | 1/2008 | Liska |
| 2008/0027747 A1 | 1/2008 | McGovern et al. |
| 2008/0086504 A1 | 4/2008 | Sanders et al. |
| 2008/0133343 A1 | 6/2008 | Hyder et al. |
| 2008/0195464 A1* | 8/2008 | Brooks .................. G06Q 40/04 |
| | | 705/7.42 |
| 2008/0206725 A1 | 8/2008 | Diaz et al. |
| 2008/0281620 A1 | 11/2008 | Schalk et al. |
| 2008/0300966 A1 | 12/2008 | Gocha, Jr. |
| 2009/0319289 A1 | 12/2009 | Pande |
| 2010/0070492 A1 | 3/2010 | Dattatri et al. |
| 2011/0039249 A1 | 2/2011 | Packard et al. |
| 2011/0055098 A1 | 3/2011 | Stewart |
| 2011/0136085 A1 | 6/2011 | Leroy |
| 2011/0246571 A1 | 10/2011 | Klier et al. |
| 2012/0197835 A1 | 8/2012 | Costa et al. |
| 2013/0031015 A1* | 1/2013 | Schneider ...... G06Q 10/063112 |
| | | 705/321 |
| 2013/0096991 A1* | 4/2013 | Gardner ................ G06Q 10/06 |
| | | 705/7.42 |
| 2013/0198098 A1 | 8/2013 | Schneiderman et al. |
| 2013/0290208 A1* | 10/2013 | Bonmassar ............ G06Q 50/01 |
| | | 705/321 |
| 2014/0019854 A1 | 1/2014 | Alexander et al. |
| 2014/0046862 A1 | 2/2014 | Weingarten et al. |
| 2014/0207770 A1* | 7/2014 | Madsen ........... G06F 17/30699 |
| | | 707/730 |
| 2014/0214710 A1* | 7/2014 | Dubner .............. G06Q 10/1053 |
| | | 705/321 |
| 2014/0279635 A1* | 9/2014 | Bramlett, Jr. ...... G06Q 10/1053 |
| | | 705/321 |
| 2015/0111192 A1 | 4/2015 | Mihai et al. |
| 2015/0248648 A1* | 9/2015 | Rao .................... G06Q 10/1053 |
| | | 705/321 |
| 2016/0379170 A1 | 12/2016 | Pande |

FOREIGN PATENT DOCUMENTS

| | | |
|---|---|---|
| JP | 2002-366790 A | 12/2002 |
| JP | 2002-373268 A | 12/2002 |
| JP | 2003-196433 A | 7/2003 |
| JP | 2005-190174 A | 7/2005 |
| JP | 2009-301569 A | 12/2009 |
| JP | 2010-061183 A | 3/2010 |
| JP | 2010-231685 A | 10/2010 |
| WO | 2001/88781 A2 | 11/2001 |
| WO | 0188781 A2 | 11/2001 |
| WO | 2005/010789 A1 | 2/2005 |
| WO | 2011/031456 A2 | 3/2011 |
| WO | 2015/136555 A2 | 9/2015 |

OTHER PUBLICATIONS

Ricci, F., et al., Recommender Systems Handbook, Oct. 28, 2010, Springer. [Retrieved from the internet on Jun. 1, 2020: <URL: https://link.springer.com/book/10.1007/978-1-4899-7637-6>].

Russell, M.A., et al., "Mining the Social Web: Data Mining Facebook, Twitter, LinkedIn, Google+, GitHub, and More", Oct. 20, 2013.

Wikipedia: "Data Mining", Internet Article, Mar. 13, 2004, [Retrieved from the internet on Jul. 3, 2017: <URL:https://en.wikipedia.org/w/index.php?title=Data_mining&oldid=599484738>].

Wikipedia: "Expertise Finding", Internet Article, Apr. 25, 2013, [Retrieved from the internet on Jan. 28, 2019: <URL: https://en.wikipedia.org/w/index.php?title=Expertise_finding&oldid=552151957>].

International Search Report and Written Opinion, for International Application No. PCT/IN15/00128, dated Nov. 24, 2015, pp. 1-6.

Extended European Search Report, for Application No. 15 760 651.8, dated Jul. 12, 2017, pp. 1-9.

Result of Consultation for European Application No. 15 760 651.8, dated Nov. 22, 2019, pp. 1-3.

English translation of Japanese Office Action, for JP2016-574522, dated Feb. 27, 2019, pp. 1-11.

Liu, N.F. and Carless, D., "Peer Feedback: The Learning Element of Peer Assessment", Teaching in Higher Education, Jul. 2006, vol. 11(3), pp. 279-290.

* cited by examiner

CORE DATA SOURCES/ELEMENTS OF CAREER ANALYTICS PLATFORM

1. RESUME SCORING ALGORITHMS
2. RESUME SCORING BENCHMARKS
3. CORE SKILLS/COMPETENCIES BENCHMARKS FOR EACH DISCIPLINE FOR STUDENT
4. CORE SKILLS/COMPETENCIES BENCHMARKS FOR EACH JOB ROLE AND EXPERIENCE LEVEL

1. COMPETENCIES/SKILLS MAPPING FOR EACH JOB ROLE
2. BENCHMARKING FOR EACH JOB ROLE
3. SET OF KEYWORDS, PHRASES, PATTERNS, CLUSTERS CORRESPONDING TO EACH JOB ROLE

1. CAREER MAPS OF MILLIONS OF CANDIDATES
2. CAREER MATCHING ALGORITHM

1. BULLET/TEXT SAMPLES
2. BULLET MATCHING ALGORITHM

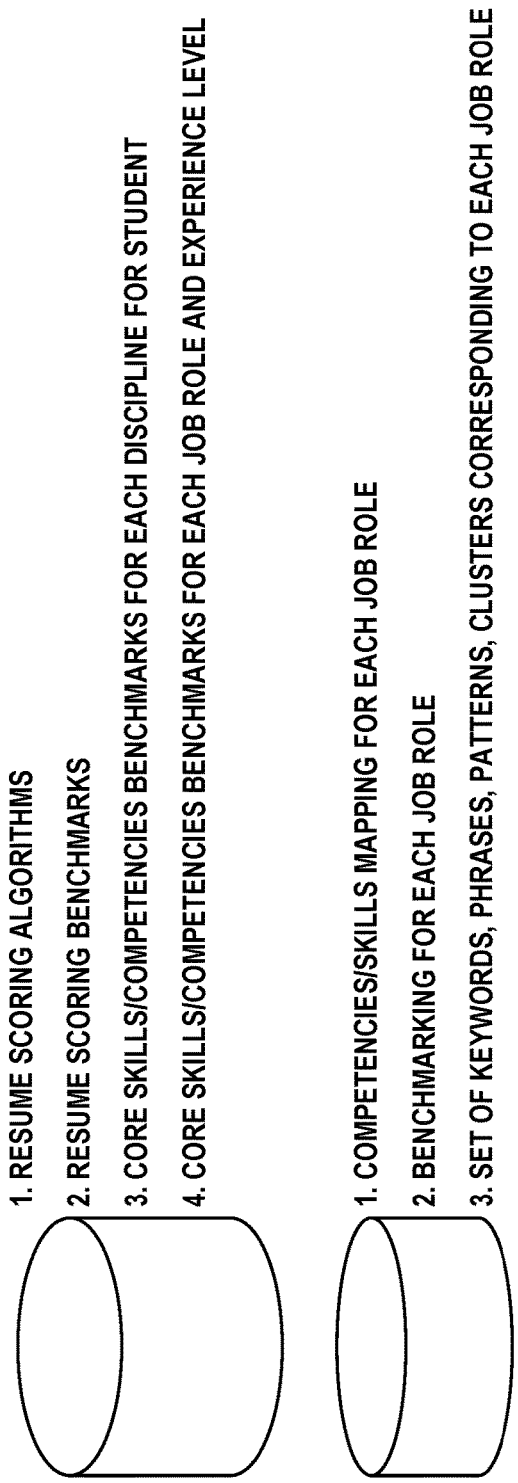

Figure 2

MACHINE LEARNING ELEMENTS OF SYSTEM

- RScore and scoring across each parameter for customized and dynamic benchmarks
- Each user adds career path to system and user profile to system
- Each user with high match for a job role adds to skills/competencies/background/experiences needed for that job role, also the last job role is input into learning system
- Company analysis for what type of candidates make it to different companies
- Bullet structure and Resume structure convergence/analysis
- Keywords, phrases, relationships, data clusters for job roles, educational profiles, user profiles all add to learning system
- Career Coach/Mentor/Hiring Manager Feedback on candidate profile will provide inputs/enhancement into system feedback algorithms as well as CareerFit and Explorer modules

Figure 3

CAREER ANALYTICS PLATFORM

CROSS-REFERENCE TO RELATED APPLICATIONS

The present application is a National Stage Application under 35 U.S.C. § 371 and claims priority to International Patent Application No. PCT/IN2015/000128, filed Mar. 16, 2015, which claims priority to Indian Patent Application No. IN/765/DEL/2014, filed Mar. 14, 2014, all of which are entirely incorporated by reference herein.

TECHNICAL FIELD

The present invention relates generally to document analysis; and more specifically, to methods and systems for leveraging a users profile/resume/cv to perform smart data analytics to help various stakeholders in making better human capital decisions.

BACKGROUND

Current methods of helping users in their career journey rely heavily on human intervention, whether it is in the form of a career coach, resume writer, own personal network, etc. There are no platforms that leverage data analytics to give the consumer objective guidance on a) what they need in light of their career goals b) what their career goals should be based on their own unique profile. The invention aims to provide a data analytics based system that helps candidates make better decisions about their careers regardless of the career they are in.

On the companies side, there are limited methods that attempt to remove bias in the recruitment process, while capturing the unique requirements each company inherently has for a job role. In today's world Application Tracking Systems and other mechanisms simply use a set of keywords to filter through candidates, creating a very binary phenomenon of candidate selection. Whereas candidate selection is inherently a spectrum some candidates are a better fit for some jobs than others. The invention aims to build an automated system/mechanism to objectively, effectively and efficiently simplify the recruiting process while taking care of the inherent customizations and complexity in it. It emulates the behaviour and assessment of human mind works.

SUMMARY

In an embodiment, a method for assessing a career profile of a candidate is disclosed. The method comprising: parsing the career profile to identify at least one parameter from a plurality of parameters within the career profile; wherein the plurality of parameters are defined in a database and a plurality of scores are associated with each parameter; retrieving a score from the plurality of scores for the at least one parameter identified within the career profile; computing score of at least one category based on the retrieved score, wherein the at least one category comprises the at least one parameter identified within the career profile; and providing feedback to the candidate on the career profile in accordance with the computed score of the at least one category.

The invention aims to simulate the way the recruiter behaves when assessing information presented by a potential candidate to provide benefits to two main types of audiences.

Firstly, it demystifies for career professional how exactly they should represent themselves to recruiters to showcase their relevant skills and experiences. It helps candidates identify potential jobs for which they are a good fit, and how to chart their career journey to get to their goals.

Secondly, for the recruiter it provides a mechanism to score candidates and shortlist them removing many inefficiencies in the process to select candidates that are a fit for them based on their specific criteria not a broad job description.

The invention aims to help career professionals get objective career guidance based on data and analytics about how good their resume is both in general as well as specific to particular careers they are interested in.

It further helps them to leverage data analytics, predictive analytics to benchmark their resumes against their peer group to truly see where the quality of their skills and content on their resume is. The fundamental thought here is that career professionals don't get targeted and objective guidance based on data in todays' environment. Most innovation is targeted at helping companies filter out using basic criteria and keywords.

The invention aims to truly understand the context of the career of a professionals profile and accomplishments as listed on their resume, to rate their skills and competencies and give them a view of where they stand in general and also relative to others in similar positions.

Moving deeper into the challenges of the career professional, the invention leverages data analysis, predictive analytics and data mining to identify potential career paths that they may take to answer the question of what career paths they could pursue both in the short-term and longer term. Further, it aims to provide clarity on what are the steps the career professional can take to get to an objective, and also how likely it is for them to actually get there based on how others like them have done in the past.

On the recruiter side, the invention aims to move away from complex Job descriptions to simplify the method of filtering by providing a method to assess candidates skills, career trajectory and other elements to identify whether they will be a fit for the job or not.

Here the invention gets into the relative prioritization of the requirements that a recruiter has which is not reflected in any document, but rather is sitting in their mind. Using this the invention creates a customized algorithm for each job that the recruiter has to ensure that they are able to identify candidates who are the best fit for that. In addition by analyzing their network and other employee profiles in the company, the invention applies criteria beyond skill assessment to analyze the likelihood of a candidate making it through the recruiting process. It leverages predictive analytics in algorithms to predict where candidates fit both in the short and longer term.

This makes the invention highly relevant for any company conducting recruiting.

The invention can be used to reduce the cost of hiring by automating the first step of resume filtering, more efficiently transferring candidates through the process that are likely to succeed in other stages of recruiting.

The invention also helps job seekers identify who in their network can refer them to positions for which they have the highest likelihood of success further improving the chances of success both in the recruiting process as well as during their career journey at the company.

By matching open opportunities to their resume assessment, leveraging predictive analytics about both the candidates and other career professional career path/journey and identifying network members who are likely targets for mentoring, referring and support the application increases the likelihood of success for a career professional as well as a recruiter.

Every professional and job seeker is well versed with the concept of a career coach. A Career Coach possesses experience having dealt with a variety of other students and professionals, know-how to read from a profile/resume, understand personality issues and individual preferences to create a career roadmap including developmental interventions. Using intelligent algorithms, predictive models, context analysis using machine learning and natural language processing, VMock has built a SMART CAREER COACH that can help millions of career professionals and students assess and improve their resume/profiles; align with targeted opportunities with optimum/best match and calibrate their career decisions with Predictive Models based on crowdsourcing of career paths. This SMART CAREER COACH does not stop just at that i.e. getting you an entry into a company, but also suggests how to succeed in the role, who to target as mentor and continues to help for the next career move.

Another manifestation of the invention is a business model innovation allowing for targeting and lead generation for variety of services including head hunting, resume writing, interview preparation, etc.

Embodiments of the present invention substantially eliminate or at least partially address the aforementioned problems in the prior art, and enable efficiently management of the usage data corresponding to the plurality of tracking identifiers of the web property.

Additional aspects, advantages, features and objects of the present invention would be made apparent from the drawings and the detailed description of the illustrative embodiments construed in conjunction with the appended claims that follow.

It will be appreciated that features of the present invention are susceptible to being combined in various combinations without departing from the scope of the present invention as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present invention, exemplary constructions of the invention are shown in the drawings. However, the present invention is not limited to specific methods and instrumentalities disclosed herein. Moreover, those skilled in the art will understand that the drawings are not to scale. Wherever possible, like elements have been indicated by identical numbers.

Embodiments of the present invention will now be described, by way of example only, with reference to the following diagrams wherein:

FIG. 2 is an illustration of elements or data sources of the system in accordance with an embodiment of the present invention;

FIG. 3 is an illustration of machine learning elements of the system in accordance with an embodiment of the present invention;

DETAILED DESCRIPTION OF EMBODIMENTS

The following detailed description illustrates embodiments of the present invention and ways in which they can be implemented. Although some modes of carrying out the present invention have been disclosed, those skilled in the art would recognize that other embodiments for carrying out or practicing the present invention are also possible.

In this document there are two kinds of profiles—private user profile and a public user profile. A private user profile refers to a document like a resume/cv/objective document etc. A public profile is an open document where the user reflects his or her career profile. An example of this would be a linkedin profile. Wherever in this document a resume is referred/called out it is referring to all possible forms of a private profile. Wherever in this document a linkedin profile is referred/called out it is referring to all possible forms of a public profile.

Figure 5:
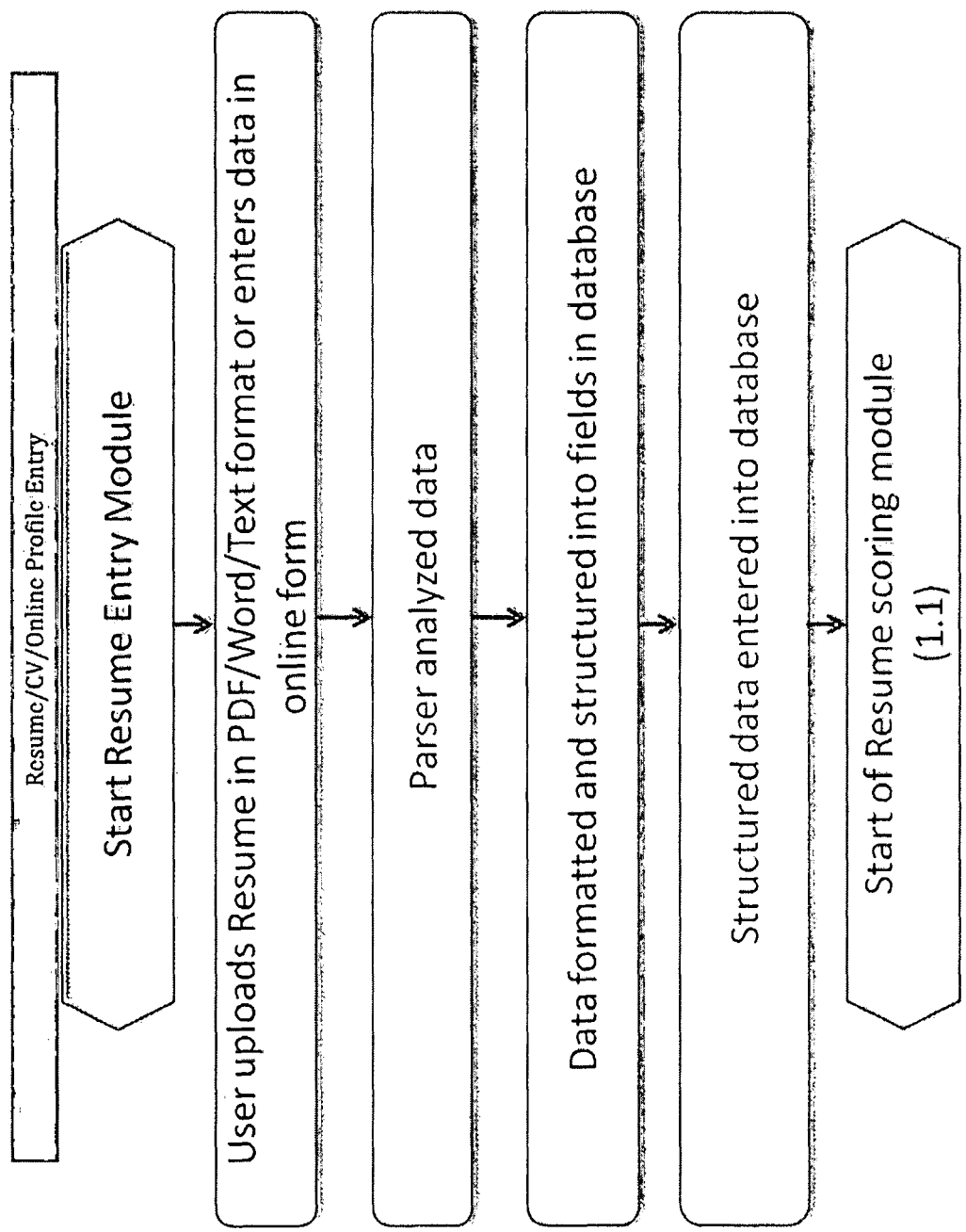
FIG. 5 is an illustration of a method for generating structure data from a career profile of a candidate in accordance with an embodiment of the present invention.

Referring to FIG. 5, the user uses the Resume Improvement module to enter their resume into the system, receive an objective score, benchmark themselves against others, identify areas of improvement and view detailed feedback on both the structure of their resume as well as the actual content within the text of the Resume/Text Profile.

Upon viewing the feedback, the user then can incorporate suggestions into their Resume, and re-score their resume to get a new Resume Score. They can repeat this process unlimited times until they are satisfied with their score and feedback on their resume.

Entering of information into the Resume Improvement module: the user can upload their resume to the system, or create a profile on the platform itself where they represent their education, skills, experiences, achievements, hobbies and other pieces of information they wish to represent in their resume or profile.

Structuring/Parsing of data: If the user chooses to upload their existing resume into the platform, the system parses the text in their resume to identify resume sections, bullets, context of skills, keywords and phrases, and stores data into a structured format.

Storing of user data in structured data in database: All elements of a users data available are stored in a structured format.

Resume Scoring, Feedback and Improvement

Figure 6:
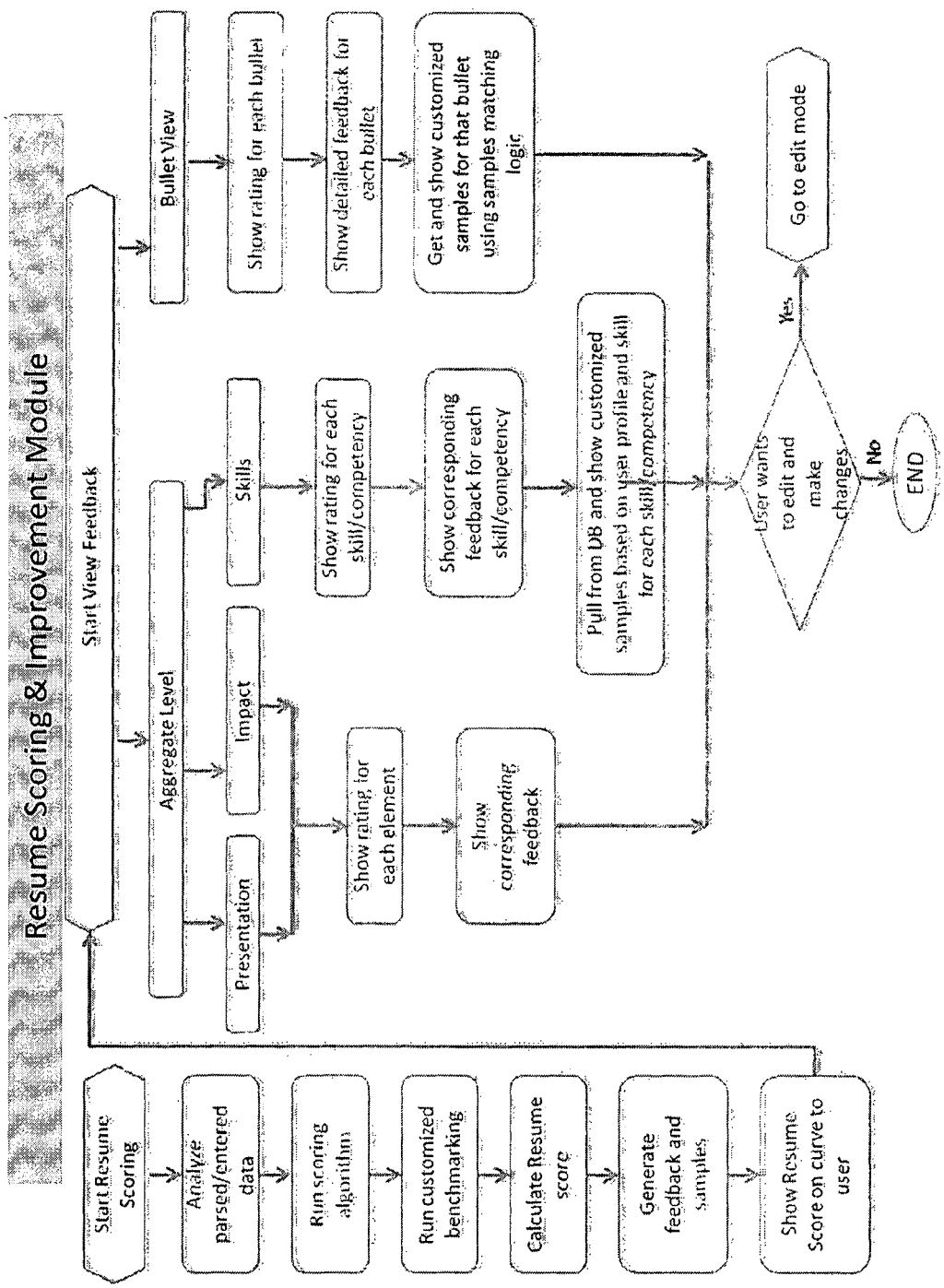
FIG. 6 is an illustration of a method for scoring and improving the resume in accordance with an embodiment of the present invention.
Figure 7:
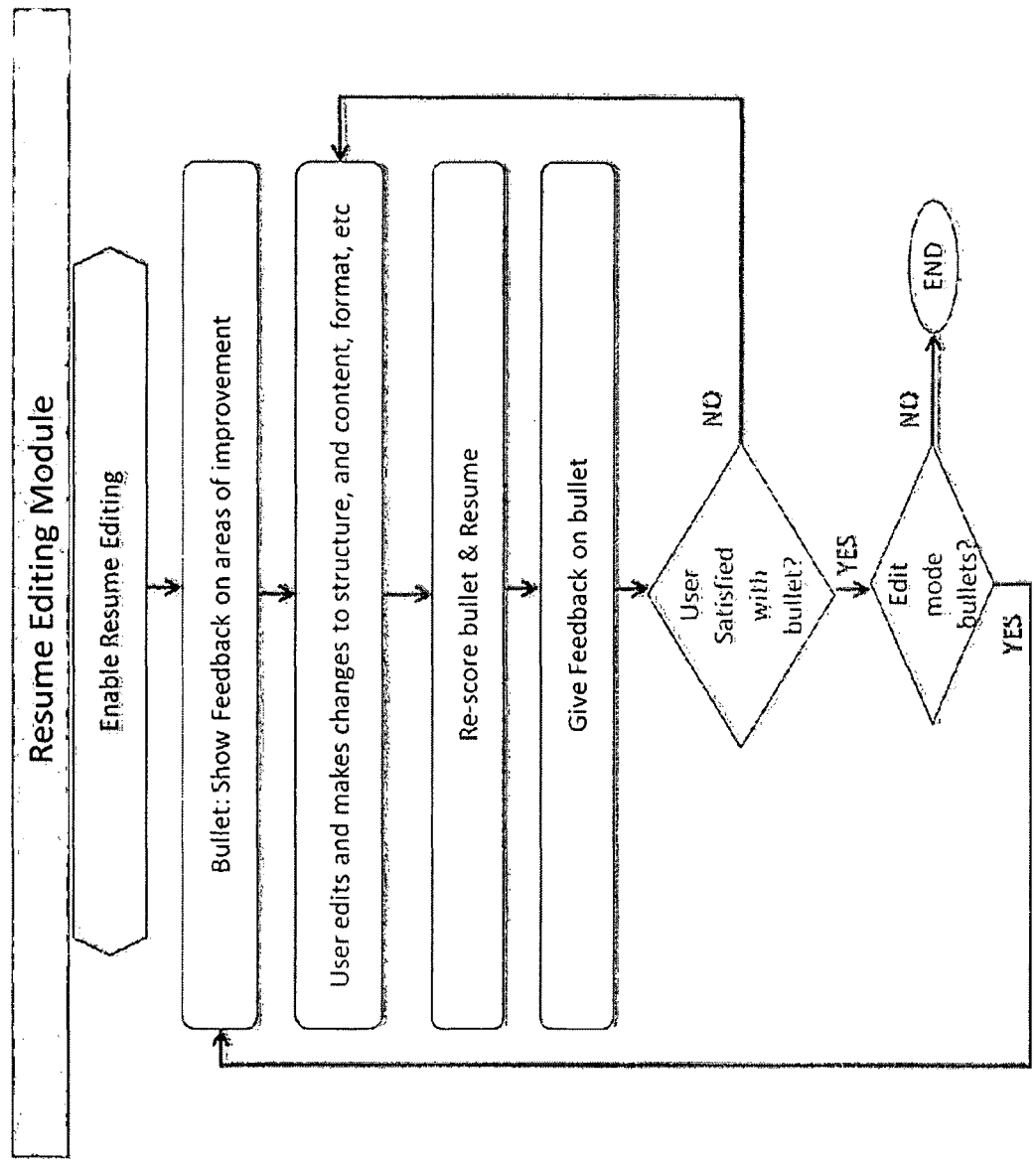
FIG. 7 is an illustration of a method for editing the resume in accordance with an embodiment of the present invention.

As illustrated in FIG. 6, each resume receives a score based on a customized algorithm. The relevant algorithm is selected based on the users experience level, job role and tier of company. Structured data extracted from resume is analyzed using natural language processing, part of speech, and matching to existing data sets of soft and functional skills, other career professionals career profiles.

The benchmarking module provides inputs into the scoring in setting the benchmarks incorporated in the score on a dynamic basis.

Summary level statistics/analysis of other users profiles are also shared with the user. These include any analysis possible on users profile including but not limited to:

1. Score improvements of others
2. Keyword clouds of other users
3. Career background averages and statistics
4. Skills profiles of other users
5. Comparison across parameters including sections, number of words, skills, number of bullets, keywords Total Resume score is calculated based on presentation score+impact score+skills score, which is then normalized and put on a 0 to 100 scale to imply %.

Presentation module score is based on the following:
1. Margins—margins in resume are matched against best case margins pulled from database of user data(rm)
2. Section layout—sections in the resume are broken down and margins and layout is analyzed and matched with values stored database (rs1)
3. Sections in resume—the sections in resume are matched against standards both for number and which sections. Based on profile certain sections are mandatory for example for students in engineering education, GPA, extracurricular, internships would be mandatory sections. The sections which are mandatory, are derived from benchmarks from other similar user groups. Number of missing sections are stored in field for scoring (rms). Users are penalized for having too many sections and too many pages.
4. Formatting—formatting of resume is analyzed to ensure alignment of all resume elements, bullets, and other content on the resume. (rf)
5. Spell check—spelling errors are identified, # of mistakes are used as parameter in scoring (rse)
6. Prioritization of content—most relevant for content should showcase on the top of relevant section.

Formula for Presentation score=$wp(w1*\alpha1*rm+w2*\alpha2*rs1+w3*\alpha3*rms+w4*\alpha4*rf+w5*\alpha5*rse)$ $w1 \ldots 5$ is pre-set with w5 being lowest weight and other elements weighted equally.

$\alpha1 \ldots 5$ is the benchmark derived from benchmarking similar user resumes across the exact parameter for example for # of sections it would be # of sections similar users have in their resumes.

wp refers to the weight presentation score has in overall resume score. The weight also varies based on user group—student and job seeker level All values are normalized on a scale of 0 to 1. 1 being maximum score, and 0 being lowest score Impact module score is a function of the following elements:
1. Career progression score
2. Bullet scores
3. Achievements score Formula for career progression—career path nodes are matched to nodes of resumes with high scores; Level of match is normalized with 1 being exact match, and 0 being no match.

Bullet scores: Based on the section the following parameters are used. Not all parameters apply to all sections, for example education section is not strict about quantification, and starting of bullets with action-oriented text.

a. Action-oriented—description of the actions candidate took in active form vs. passive form. A library of action-oriented terms is the basis for this. Strong action verbs have higher weights, and weak action verbs have lower weights.
b. Quantification—How well the candidate has quantified the impact of their actions as well as quantification of elements in the experience that will help someone understand the impact of work. This is both qualitative and quantitative values.
c. Passive usage—use of passive language in description of experience (acts as a negative parameter)
d. Size of bullet—how concise and descriptive the experience is.
e. Responsibility driven text—usage of language that describes what responsibilities were as opposed to outcome of work (acts as a negative parameter)

The optimum value for all of these parameters is set by benchmarking. When the user gets optimum value and >optimum value, they get a normalized score of 1. Each of the parameters above is also assigned a weight based on importance of parameter for user profile, like for example for students quantification weight may be lower than for a sales professional. Again benchmarking of similar user profiles is done to determine what level is appropriate for each group.

Score of each bullet is calculated using a combination of above parameter, all bullet scores are added and averaged to get bullet score of user.

Bullet score=$(b1+b2+b3 \ldots bn)/n$ where $b1$ is score of bullet 1 and so on.

Included in the impact score is also an assessment of achievements that user has stated on their resume that are part of educational, and other sections. Another dimension in assessment is consistency of achievements.

Achievements are broken down into academic, and non-academic achievements such as GPA, Honors, Awards, Scholarships, Organization memberships and other areas mentioned in a users resume. (ra)

Achievement score=$w1*ra1+w2*ra2 \ldots +wn*ran$

Weights vary based on importance of a particular achievement given the user profile and background, and goals.

Total Impact score=$wcp*cpscore+wi*iscore+wa*ascore$

Where wcp=weight of career progression, wi=weight of impact, wa=weight of achievement Total impact score itself is then normalized and used in computation of total resume score Skills Score is based on combination of soft (behavioral) skills, and function, industry specific skills Based on a users profile, the set of soft skills, functional and industry relevant skills are chosen which are most important. These are pulled from the database of job roles/profiles. For instance a student would mainly focus on 5 core soft skills as communication, problem-solving, teamwork, leadership and initiative and some skills relevant to the degree they are pursuing. Where as a job seeker in the healthcare industry would be rated on soft skills, functional and industry relevant skills that correspond to their current profile.

To obtain the skills score the following is done:

To provide a score on skills the analytics engine takes all data stored in the users profile and identifies what job role/function/industry the user fits into for job seekers, and for students—degree discipline, desired function/company.

1. This data is then matched with skills matching database that contains keywords, phrases, job roles, patterns that determine whether someone has a skill or not.
2. For each skill—a count of matches is generated with weights for each match is calculated
3. Count of matches and weight is added up and matched to benchmarks for that "type" of profile. The score is then normalized on a 0 to 1 scale. Benchmarks determine whether the user is high, medium or low on a skill
4. This is repeated for all skills stored in the database for that particular profile of user.

skill score=sum (all keywords weights)–normalized on a 0 to 1 scale where 1 is highest level competency for that skill and 0 is not having that skill. This is repeated for all skill Total skills score=$w1*\alpha1*s1+w2*\alpha2*s2+ \ldots +wn*\alpha n*sn$ Another element of the score is whether the candidate has gaps in there career—this could potentially be a negative factor in the score.

As illustrated in FIG. 6, the user is provided with their Resume Score that is benchmarked dynamically and plotted on a curve, to show where they stand amongst the relevant peer group. The process of plotting their resume is as follows:

1. A dynamic benchmarking curve is created based on scores of a target peer group, the peer group can be customized, and is broad or specific as desired by the user or community. It can be a plot of all users in the system, only those within the same role as user, or all students with similar backgrounds, or only employees within that company in that job role, etc. All possible parameters of user profile including education degree, college, job role, experience, company name, can be applied as filters to determine the relevant user cluster
2. The user is then plotted on this normal distribution curve and illustrated exactly where the user stands, based on benchmarking the user is told whether they have a poor score, ok score, or a great score relative to that peer group.

Referring to FIG. 6, the user can view the feedback on their resume on all of the areas—presentation, impact, and skills in an aggregate view as well as a detailed view.

In the aggregate view they can see exactly where their resume stands in each area. This information is represented is an visual manner with samples for all areas, where the platform gives the user customized samples to see how they can do better.

The samples are pulled from the samples library matched to the users profile to ensure they are relevant for the user using tags already in the system.

To view detailed level feedback, the user gets into the bullet-view where they are provided with detailed feedback on all relevant parameters based on which section of the resume the bullet is in.

1. Feedback on all parameters is provided displaying the logic for scoring a bullet high, medium or low.
2. For each bullet customized samples are found in the samples library using the following logic:
   a. Parse each bullet using language processing to identify action, primary objects and other elements.
   b. Match keywords and phrases against those in samples
   c. Use encoded priority to identify which phrases, keywords, word patterns to prioritize during matching
   d. Score bullets' found based on matching criteria and showcase sample bullets with highest match score to user The following formula is used to determine the bullet match score:

Bullet match score=Sum (Score of keywords matched)+Sum (Score of phrases matched)

Normalize on scale of 0 to 1.

Figure 8:
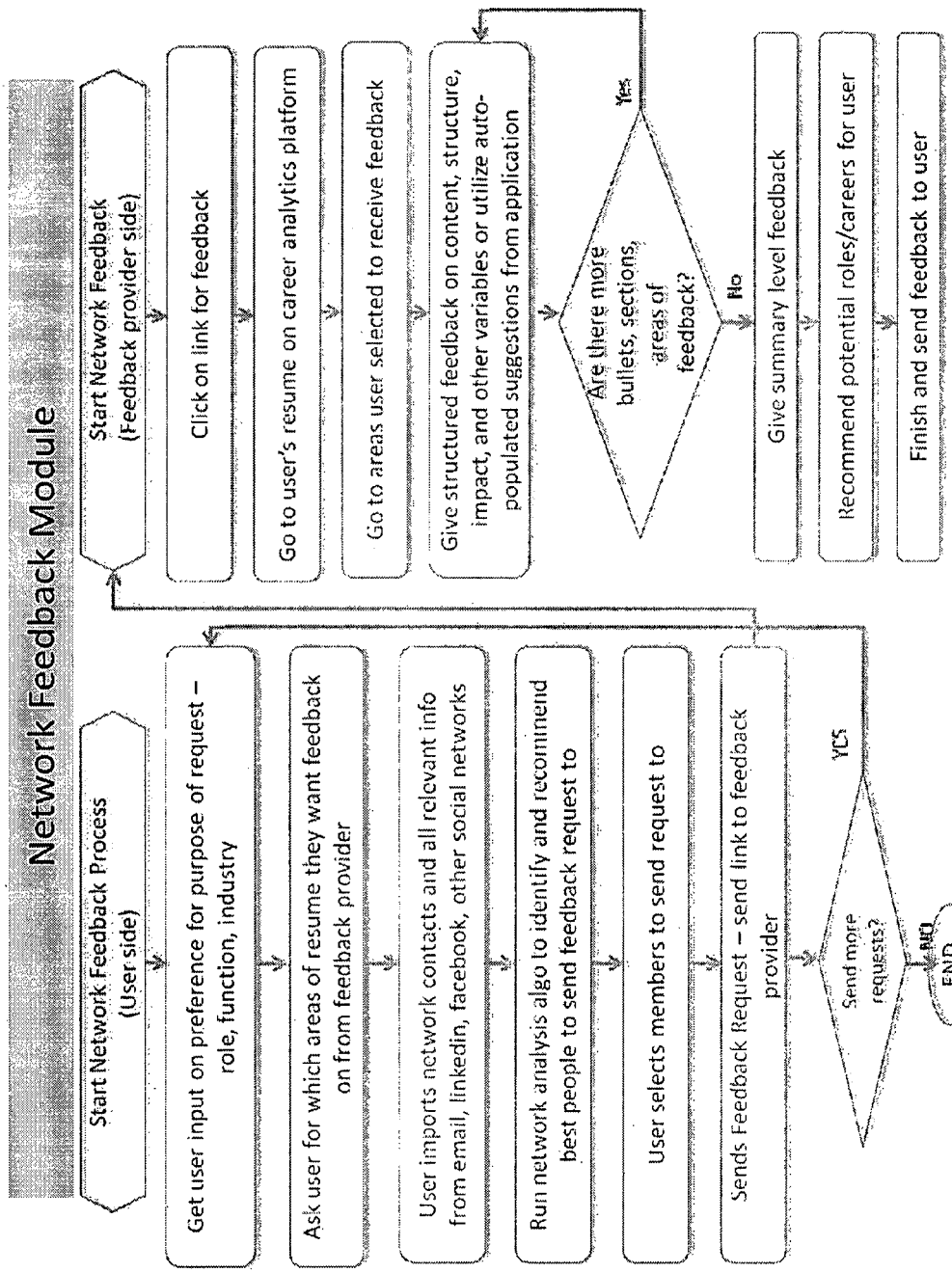
FIG. 8 is an illustration of a method for providing feedback from a network of the candidate in accordance with an embodiment of the present invention.

3. The user views the feedback on his/her bullets along with the customized samples As illustrated in FIG. 8, after viewing feedback the user enters edit mode online or offline to make suggested changes to his/her resume. In edit mode the user does the following:
   a. Makes changes to resume elements/bullets
   b. Re-runs scoring of resume or just bullet
   c. Reviews feedback again
   d. Repeats this process until user is satisfied The user follows a process of dynamic score based Score Improvement of their profile where they follow a process leveraging feedback from the system to dynamically score their improvements and also see the score improve dynamically.

A higher resume score increases likelihood of getting an interview.

Figure 9:
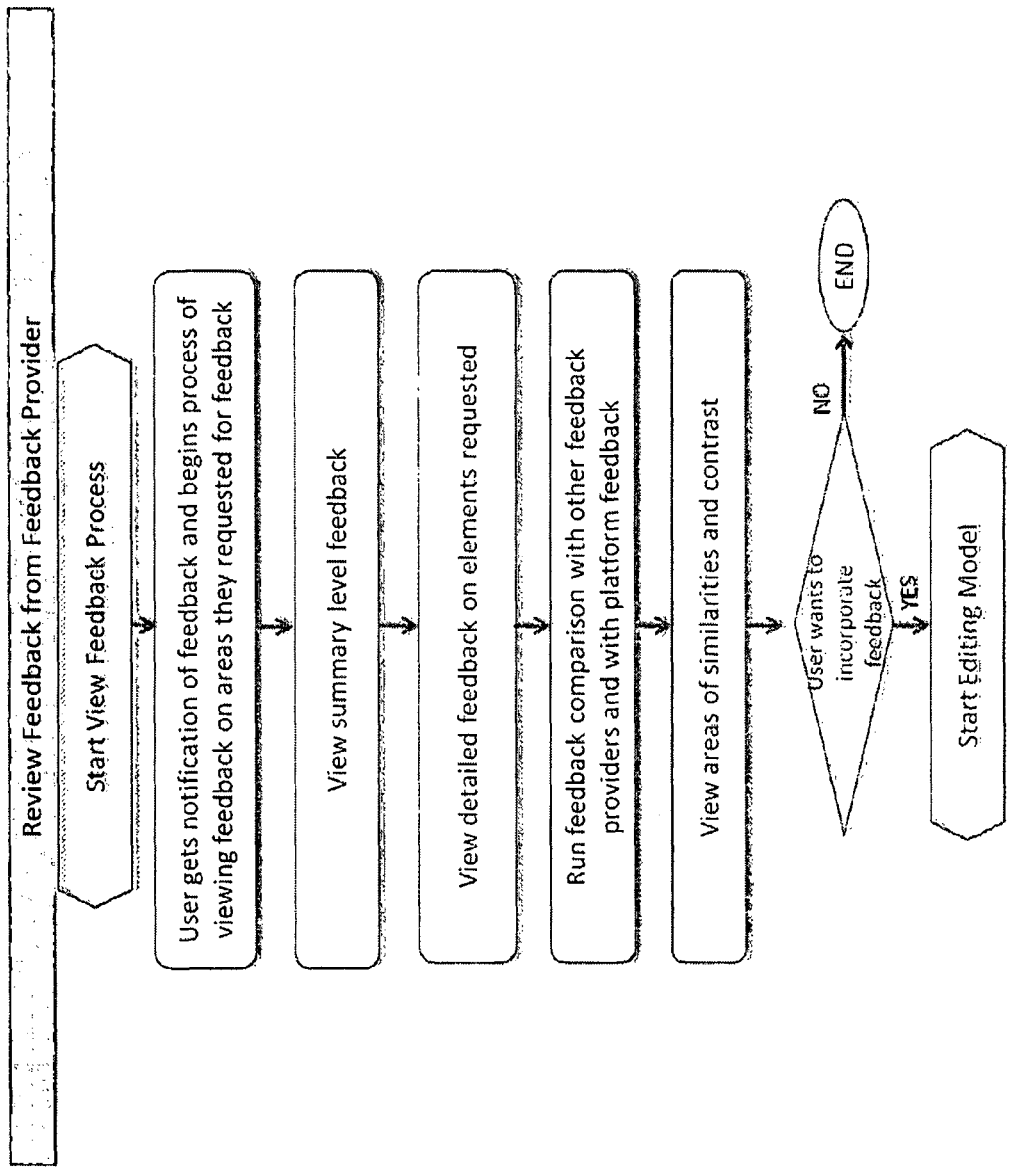
FIG. 9 is an illustration of a method for providing feedback to the candidate in accordance with an embodiment of the present invention.

Referring to FIG. 9, the user can use the platform to request for feedback virtually on their resume from an external entity, this could be someone that is in their professional network, that is a career coach in college, friend, or anyone they are connected to.

The platform allows users to port members of their email, social networks (like Facebook, linkedin, etc), or simply entering an email address of the intended recipient.

Based on the career objective of the user, the platform recommends who to send the request to. Network members are scored based on how relevant they are to the users. Members who are in similar desired roles, or companies, or HR managers within desired companies/industries/functions are also prioritized above those that do not match any of these criteria. The user however can bypass any of these recommendations and select whomsoever they want to send the request to.

Networkscore=pastjobrolematch+pastfunctionmatch+ pastjobrolefunctionindustrymatch+desiredcompanymatch+$w*HR+w*$generalsmartsmatch Pastjobrolematch=1–if exact match, similar job roles are 0.8match, and no match is given 0.

Similar logic is done for pastfunction and other matches, where harmonized data sets on job roles, company, function are leveraged to assess the "closeness" of a job role, function, industry, company, college on a normalized scale.

The system scores network members and presents those with highest scores, the user selects on of these members or decides to send to whomsoever they wish to do so.

In addition the user selects what areas of the resume they want feedback from their network member. This can be at:
1. Bullet level
2. Section level
3. Highlighted portion level
4. Entire resume itself An email with a link to the users resume is sent to their network member.

The network member clicks on the link and is taken to the platform where they can start the process of giving feedback to the user The Feedback provider gives feedback to the candidate on the following dimensions on the areas that the user had selected:
  a. Bullet level—for each bullet, both structure and content; standard rating of bullet
  b. Presentation—overall presentation
  c. Communication—overall communication of resume elements
  d. Rating for content and communication
  e. Overall rating/scoring of resume—Feedback providers score of resume
  f. Feedback on next career step for candidate
  g. Inputs on other parameters of candidates career including but not limited to education, roles, open opportunities, companies, training programs, people to network and talk to and others.

Once the feedback provider is done giving feedback to the user, they can submit their feedback.

Figure 1:
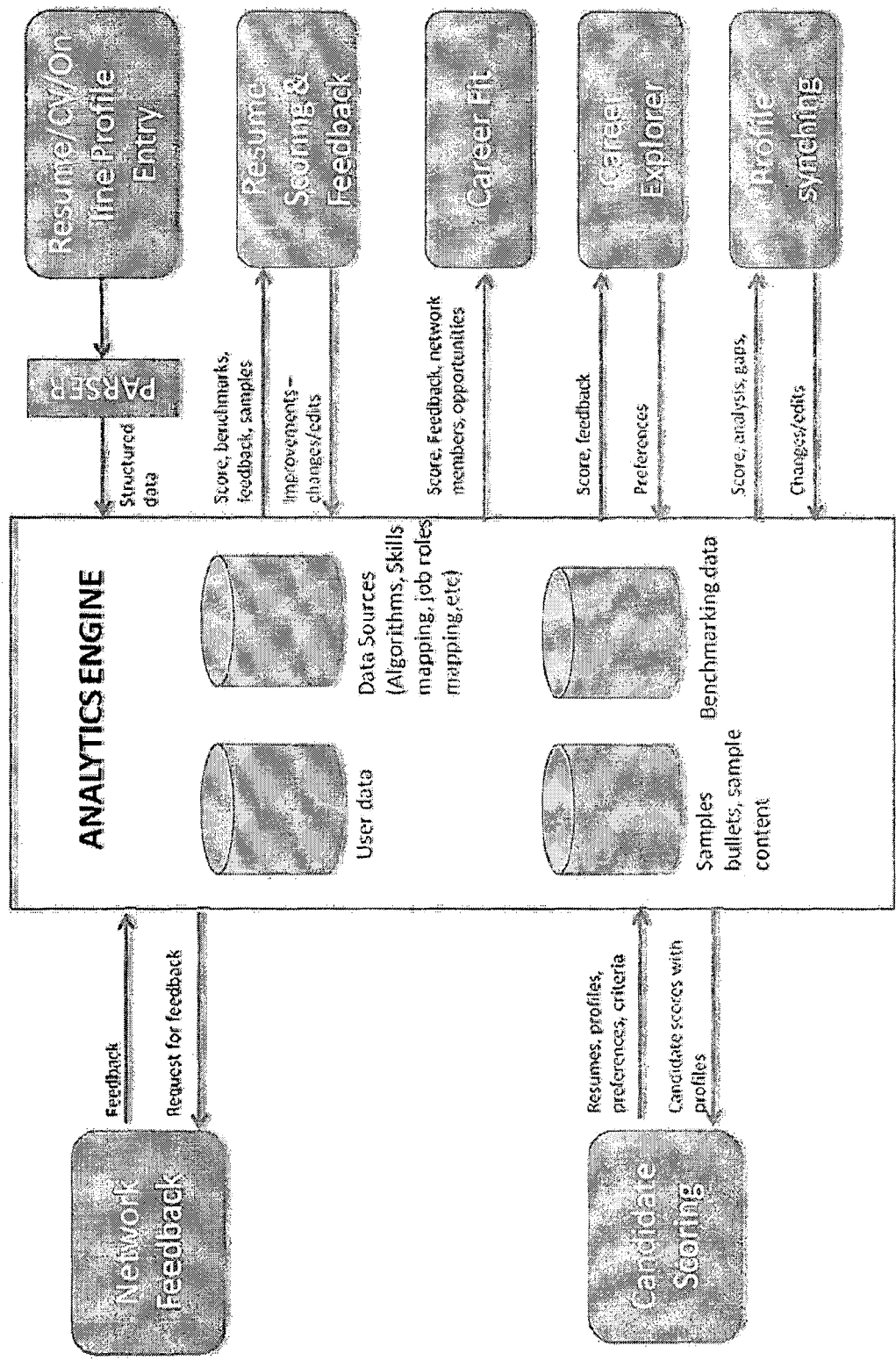
FIG. 1 is a schematic illustration of a career analytics platform in accordance with an embodiment of the present invention.
Figure 4:
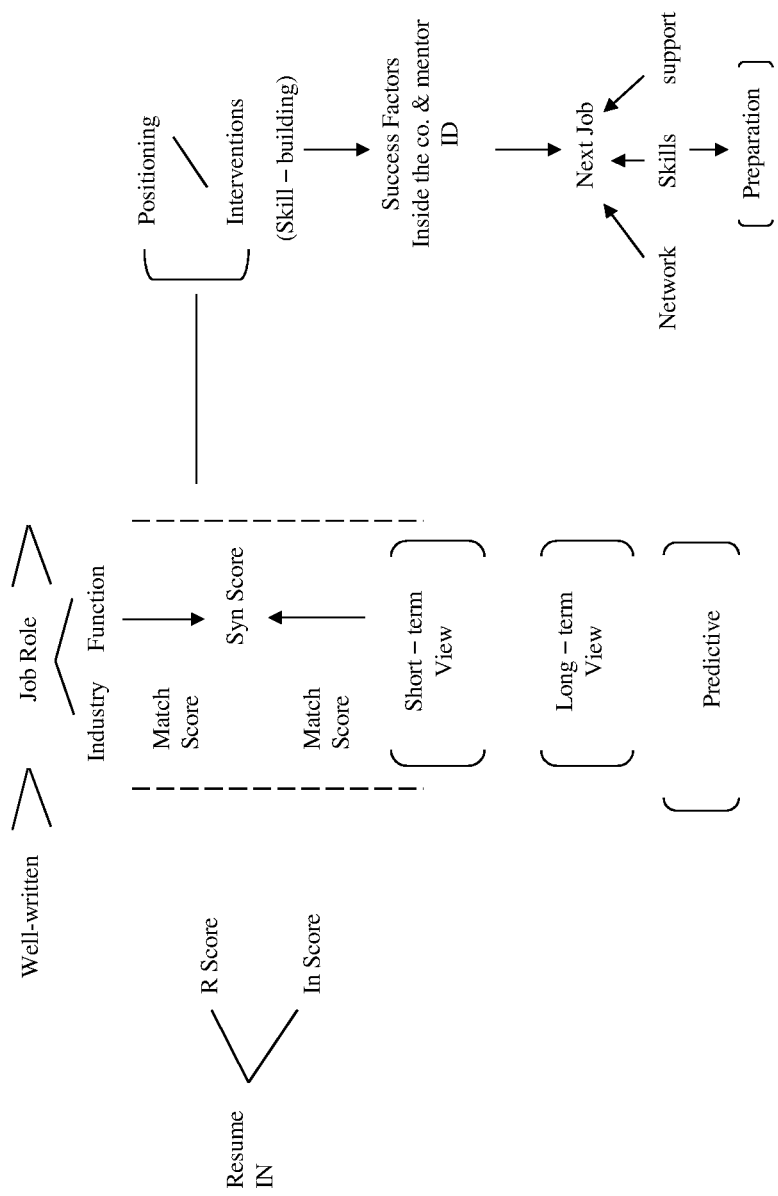
FIG. 4 is an illustration of a career coach in accordance with an embodiment of the present invention.

Upon submitting their feedback, the candidate/user of the platform can now view the feedback that was given by their network member as illustrated in FIG. 1.5

The user can also compare and contrast feedback on each element and see average scores across feedback providers, as well as see patterns across feedback providers. The system analyzes all the data, identifies themes and presents these back to the user to showcase:
1. Main areas needing improvement
2. Areas where the user is doing a good job
3. Inconsistencies across feedback providers
4. Heatmap of feedback showcased on the profile The user can incorporate feedback by following a similar edit process and re-score their resume to see feedback on it.

Career Fit

Figure 10A:
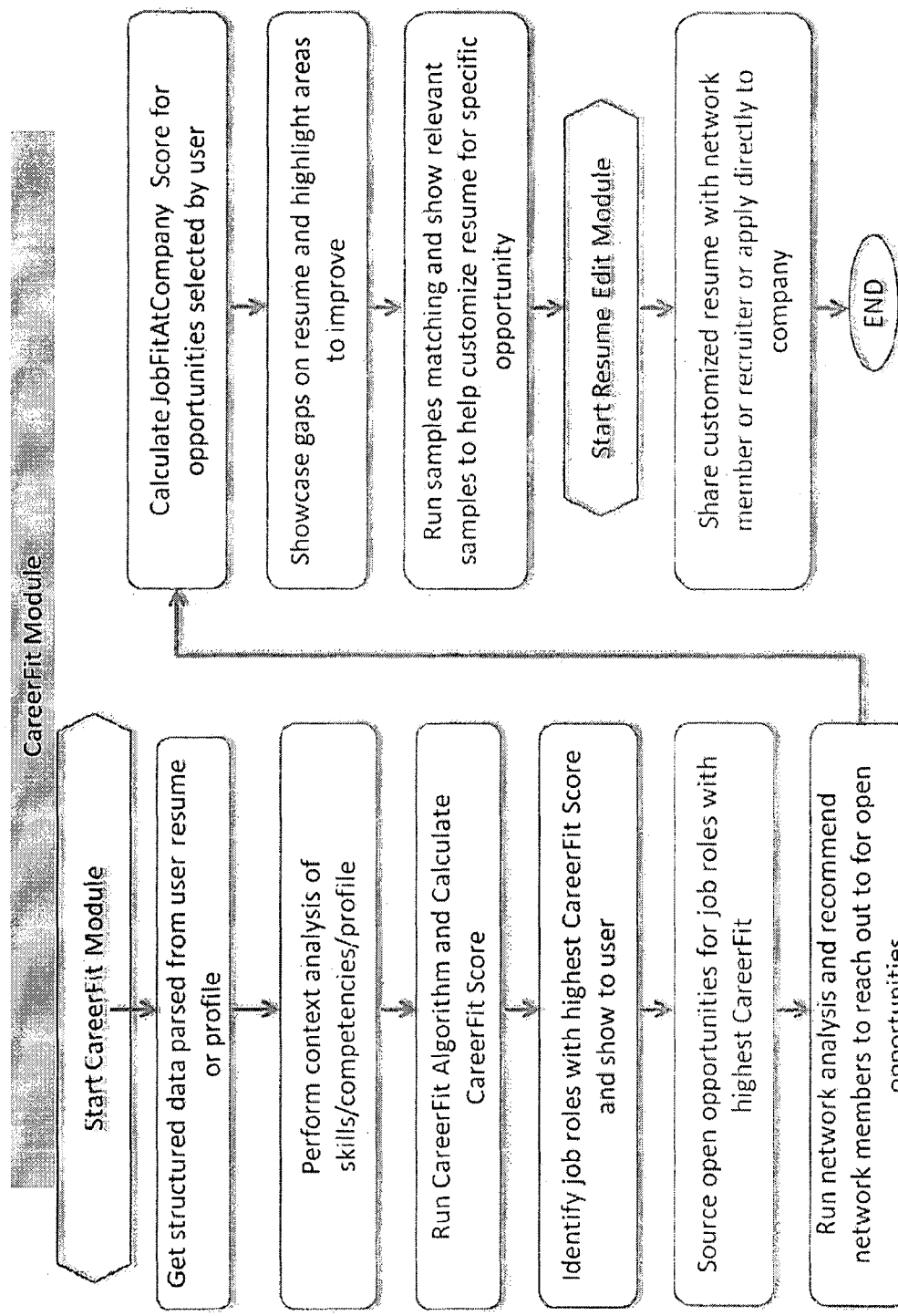
FIG. 10 is an illustration of a method for identifying career path for the candidate in accordance with an embodiment of the present invention.
Figure 10B:
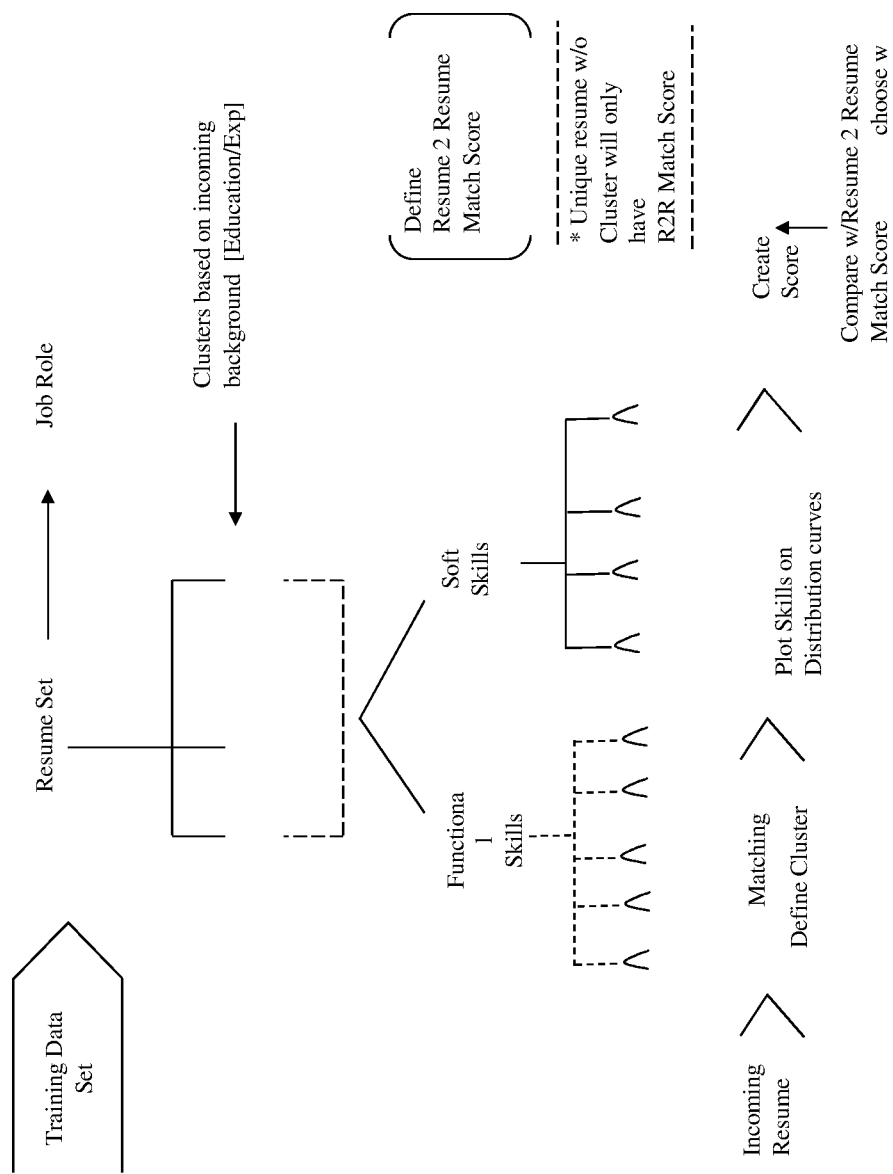

Referring to FIGS. 10A & 10B, the career fit module enables the user to identify which career paths are the best fit for him based on matches with others who have entered those career paths. As an output, the user is provided with scores for top job roles that are a fit for him.

In an embodiment, the method for computing a jobfit score is disclosed. The method identifies a cluster of career profiles within the database which includes parameters and/or categories indicating at least one career path for the candidate. The method further determines presence of at least one skill for the candidate within the cluster. Further, the method applies at least one benchmarking rule to determine score of the at least one skill of the candidate and computes the jobfit score for the candidate based on the score of the at least one skill of the candidate.

Structured data about the user is obtained from their resume/online profile which is stored in the user database. The data in the database is matched against jobs and other user profiles to create jobfit score for each job. The jobfitscore may also be referred to as careerfitscore in the description.

1. The jobfit score is calculated as follows:
2. Jobfit score=career progression match+soft skills match+functional skills match
3. Career progression match=we*education degree match+wct*collegetier+wjr1*job role1 match_. . . +wjrn*jobrolenmatch
4. Where we=weight given to education, wct=weightgiventocollegetier, wjr=weight given to job role
5. Soft skills match=skillscore1+skillscore2+ . . . +skillsscoren
6. Where skillscorei=countkeywordsmatched+countphrasesmatched+countpatternmatched
7. Skill is pulled from the table in database where job role, and match attributes are stored. The data is normalized on a 0 to 1 scale with 1 being tightest match and 0 being no match. The scale is non-linear.
8. Similar formula for functional skills match. A skills map and skills timeline is created for each user and matched to calculate the skills match for all types of skills.
9. Refer to section xyz for structure of job role matching database.
10. After calculating of scores, the scores are rank ordered and job roles with highest scores are selected Top job roles matching for a particular user are showcased visually along with the score for each role that matches in order of priority Bell-curves of skills from the user database can serve as training data or entire set of user profile is used as training set, skill patterns and also profile vectors are used to create relevant user clusters. Users closeness to other user profiles is calculated and based on match against elements of profile vector to determine match.

Elements of profile vector include all elements of users profile along with skills assessment, and assessment of other parameters including but not limited to job roles, education degree, education tier, company profile, company tier, experience timelines, skills timelines and ladders, along with other inputs.

Job opportunities available are crawled from the web and matched to the users top job roles, matching not just the job role, but the function, industry as well as tier of company that would fit the users background.

In addition, the method identifies at least one job opportunity based on the job fit score of the candidate and at least one professional from a network of the candidate for the at least one job opportunity using a network score. The method computes a jobfitatcompany score for the at least one job opportunity based on the jobfit score and the network score.

In an embodiment, the users professional network is analyzed and open opportunities where user has professional network members are scored higher increasing the jobfit score for that particular role. In an example, the network score is dependent on a group of members consisting at least one of the of members in function, members in industry, members in function in industry, members seniority in function in industry, members in HR role in industry, members in company, members in company in function, members in company in HR, and members in similar tier other companies in function The jobfitatcompany score=$w1$*jobfit score(specific to opportunity)+$w2$*networkscore where networkscore=# of membersinfunction+#membersinindustry+#ofmembersinfunctioninindustry+#ofmembers,seniorinfunctioninindustry+#membersinHRroleinidustry+#ofmembersincompany+#ofmembersincompanyinfunction+#ofmembersincompanyinHR+#membersinsimilartiercompanyinfunction The score similar to all scores is normalized to obtain the network score.

The principle idea behind this is that the user is more likely to find a job if their network is likely to be close to the opportunity as a significant % of jobs are found through ones network.

Opportunities with the highest jobfitatcompanyscore are shown to the user.

Career Explorer

In an embodiment, a method for exploring a career path is disclosed. The method includes receiving an input from the candidate regarding selection of at least one career path to be achieved within a timeframe and recommending the candidate at least one action to pursue the career in the at least one career path.

Figure 11:
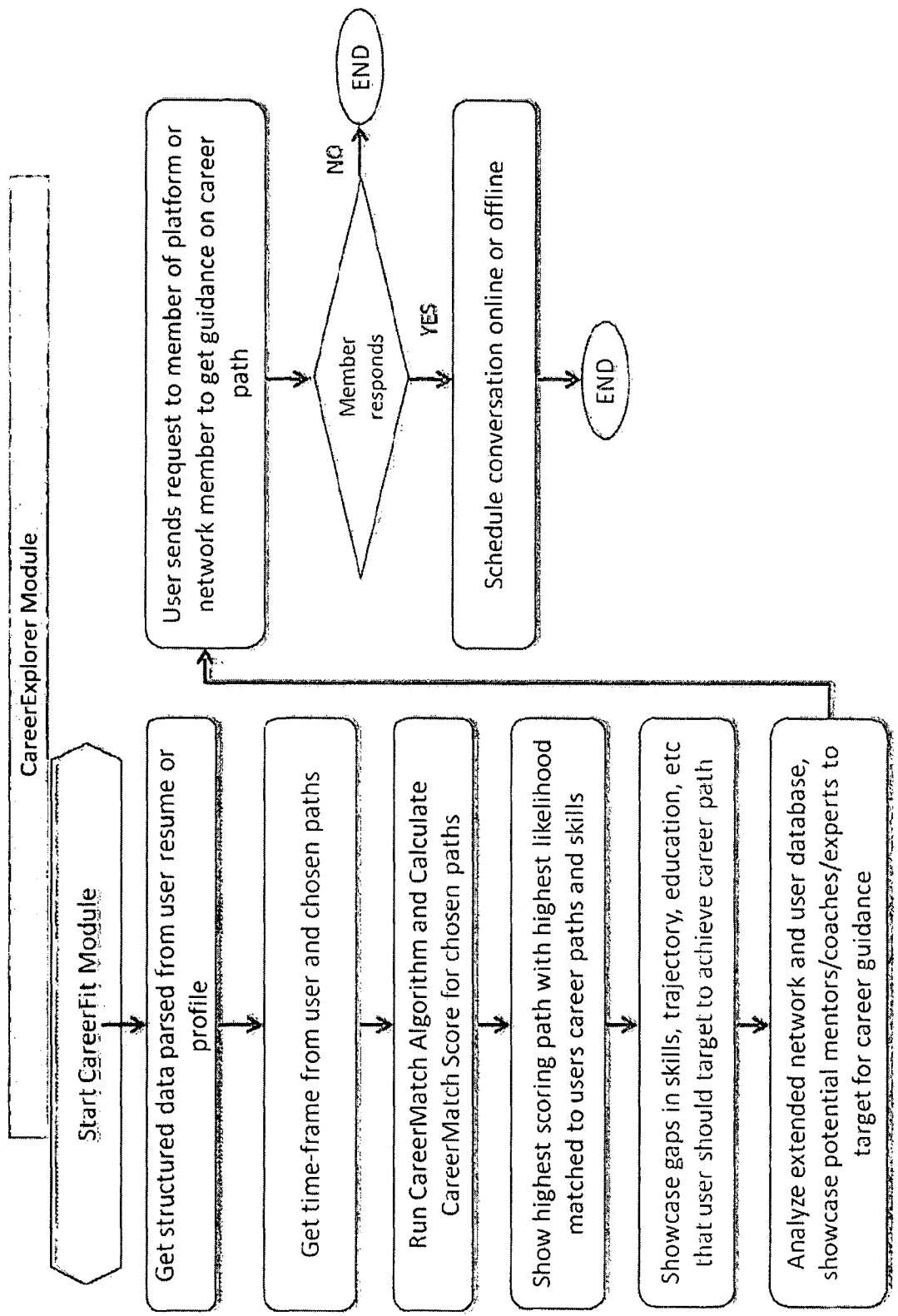
FIG. 11 is an illustration of a method for exploring a career path in accordance with an embodiment of the present invention.

As illustrated in FIG. 11, another manifestation of the career fit module is when the user is allowed to select and explore career paths. This module in the application allows the user to select a career goal, and identify what are the gaps in his/her career and how likely he is to be able to achieve that career goal. Career goal can be a particular job role in general, or a particular job role within a company, or a particular job role in an industry. In addition, the user can input a time dimension to the goal, which can be short term (1-2 yrs), medium term (3-5 yrs), and long-term (5+ years).

The user selects careers interested in and defines timeframe against those. CareerFitscore is calculated for all careers chosen by the user.

The score is calculated as follows:
1. Identify user profiles from database in selected career
2. Match users career trajectory to those in career. If perfect matches in time-frame, with most frequent paths give 1 on normalized score, if no match found give score of 0.
3. CareerFitScore=CareerProgressionmatch (refer to 0081) in specified time frame. For short-time frame look at match with what other users in similar career were doing 1-2 years ago, and same for other time-frames In the next steps gaps in skills, trajectory, education, etc that user should target to achieve career paths are illustrated. Gaps are showcased on the following dimensions:
  Skills/Competency levels
  Educational background
  Career path info
  The user is able to visually see the gaps in levels of skill To help the user get career guidance also to understand how to target career tracks, the system analyzes their extended network and the system user database, showcase potential mentors/coaches/experts to target for career guidance.

The user sends a request via the system for guidance and take the conversation offline or continues it on the platform leveraging communication tools provided.

Resume Synching with Social Network Profile (e.g. LinkedIn)

In an embodiment, a method for identifying synchronization between two profiles of the candidate is disclosed. The method includes receiving another career profile of the candidate, determining synchronization between the career profiles of the candidate via matching at least one of the parameters and categories between the career profiles and indicating to the candidate an extent of synchronization between the career profiles of the candidate.

In addition, the method includes computing job score for at least one job for the career profiles of the candidate and determining a job synch score for the at least one job for the career profiles of the candidate.

Figure 12:
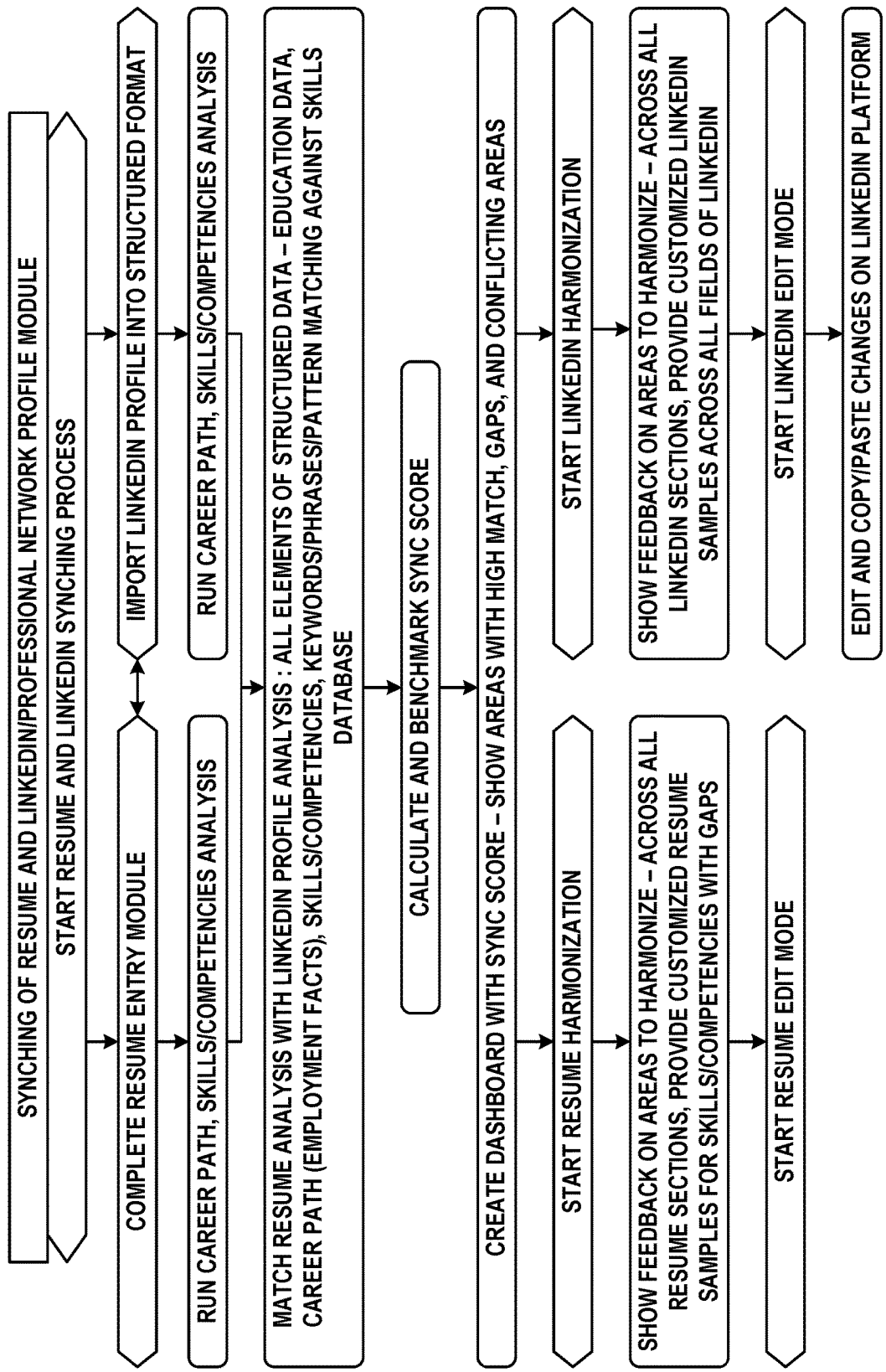
FIG. 12 is an illustration of a method for synchronizing different profiles of the candidates in accordance with an embodiment of the present invention.

Referring to FIG. 12, a manifestation of the application is ensuring that a users resume and linkedin profile as consistent and presenting the same information to employers. The application can be used to highlight what compare and contrast the resume and linkedin profile. While this process is highlighting what the application would do in relation to a resume and linkedin profile, needless to say that it doesn't have to be only a linkedin profile, any social network profile showcasing the users career information can be used here.

As a first step the user imports their linkedin profile, data from the linkedin profile is structured into the same fields in the database to facilitate matching and reconciliation.

The profile is analyzed, and career path, soft and functional skills and competencies are identified in exactly the same manner as in the Resume Scoring and CareerFit processes.

The following elements are matched:
1. Career Path from both the resume and linkedin profile are created and matched to see if they are consistent. Data of both paths is stored and gaps in either are identified
2. Skills Analysis—data from resume and linkedin profile (all text) is analyzed, frequency is calculated for each skill and a competency rating is assigned (similar to skills scoring process as defined above). This is done for all soft skills and functional skills found in both the resume and linkedin profile.
3. Educational, additional and other sections data—data from all other sections is also matched to ensure that there is consistency in naming as well as content.
4. Keywords and phrases, patterns—frequencies of keywords, phrases and other text patterns are analyzed in both and used in displaying the distribution of the same to the user After analysis, the data is represented back to the user to showcase the following:
1. Areas where skills/competency ratings same in both
2. Areas where skills/competency ratings different
3. Difference in keywords, phrases, etc used in both
4. Analysis of what resume is projecting as users career interest, vs. what linkedin is showing as career interest, based on careerfit match of both
5. Career path gaps and mismatches
6. Resume strengths vs. Linkedin strengths Leveraging predictive analytics the system can showcase aspirational profiles to the candidate to showcase where their career path could go. Public profile should be optimized around aspirational goals. Candidates may have multiple aspirations so the profile should be optimized around a portfolio of aspirations.

Synch score can be calculated for any job and will vary across job roles.

Candidate Assessment/Scoring

In an embodiment, a method for customizing the jobfitscore is disclosed. The method includes receiving an input from a recruiter regarding at least one job; wherein the input comprises at least one of a job description, at least one parameter corresponding to the job description and at least one weight for the at least one parameter, accessing career profiles of a plurality of candidates in a resume database and determining jobfit score of each career profile in accordance with the input of the recruiter.

Figure 13:
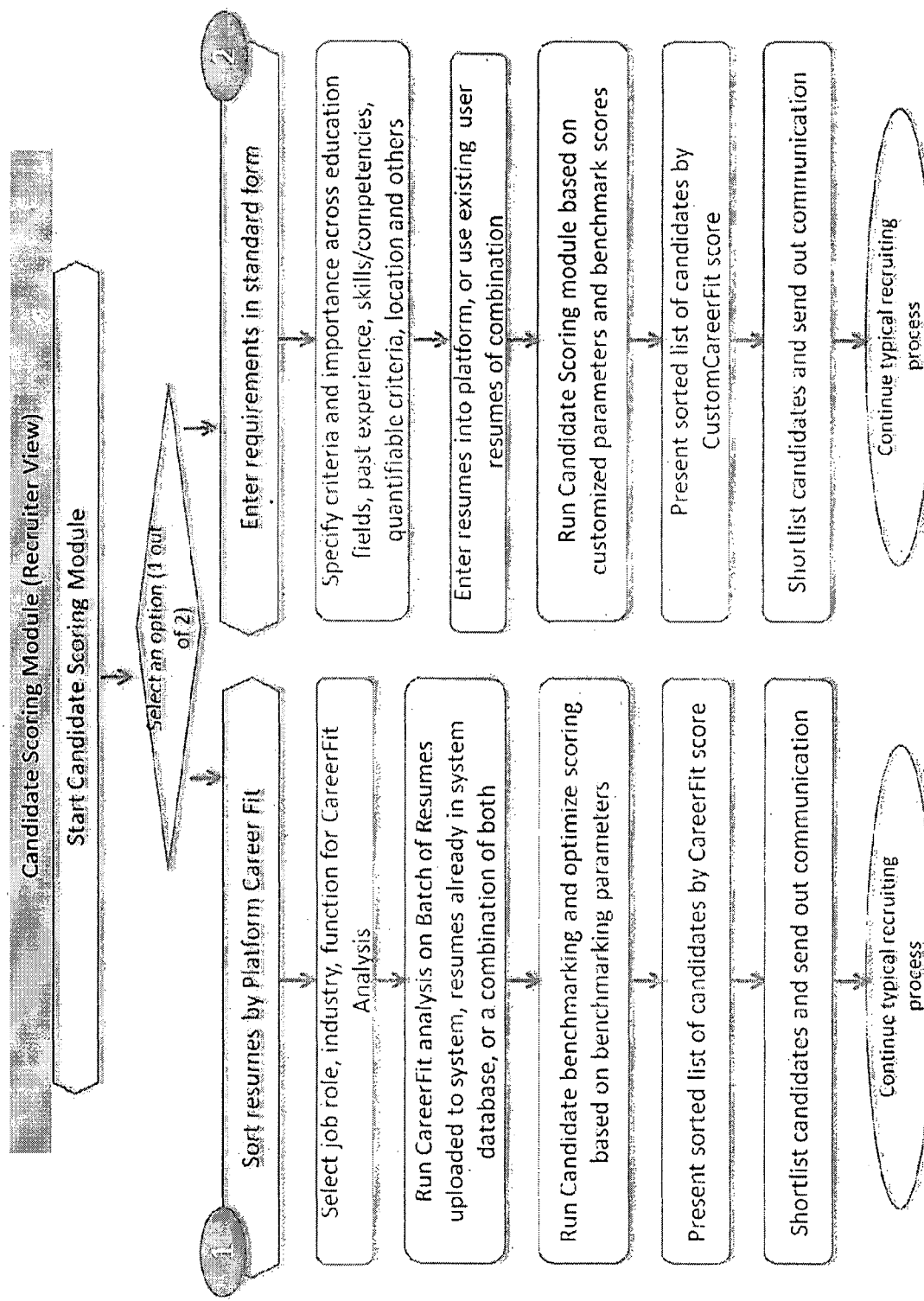
FIG. 13 is an illustration of a method for scoring the candidate by a recruiter in accordance with an embodiment of the present invention.

Referring to FIG. 13, another manifestation of the innovation is that companies/recruiters can use elements of CareerFitScore and ResumeScore to filter out relevant candidates and calculate the CandidateScore for all candidates.

The recruiter can either score/filter existing user database residing in application or enter a set of resumes, run them through candidate scoring module or combine resumes in the system and those that he/she uploads from,his/her own recruiting platform.

Candidate scoring is done in one of two ways as illustrated in FIG. 5 or combination of both.

Option 1. The recruiter decides to use platform job roles to identify high scoring candidates. This is done by leveraging existing CareerFit algorithm for that job role. Once CareerFit scores are calculated across all resumes, they are benchmarked against the entire set, and the scores are plotted on a normal distribution and optimized as follows:
  Set highest level score benchmark as highest scoring candidates/resumes removing outliers
  Normalize all scores relative to new benchmark set by highest scoring resumes where that resume would get 1 and the bottom most would be close to 0.
  Plot all CustomizedCareerFit Scores on normalized scale as new distribution of CandidateScores Option 2. The recruiter decides to enter specific criteria and relative priorities across criteria selected by Recruiter to calculate CustomCandidateScore for each candidate. The recruiter can also load a job description into the system and get matches using the below criteria.

The following is the structure for entering criteria.

Education Parameters
  1. Education Degree—specific degree e.g. BSc or MBA in Finance; Ranking/Importance (High, Medium, Low, None)
  2. College name—specific name; Ranking/Importance (high, medium, low, none)
  3. College Tier—Tier 1,2,3; Ranking/Importance (high, medium, low, none)
  4. GPA—Ranking/Importance (High, Medium, Low, None)

Job Role—Parameters (Across Past 3 Experiences)
  1. Job role—specific role e.g financial analyst, etc; Ranking/Importance
  2. 2 Job role—function; Ranking/Importance
  3. Yrs exp—specific; Ranking/Importance Duration score primarily depends on the number of months of work experience
    a. Each position has an optimal duration
    b. For example if a candidate remains in a Junior post for a long time the duration/experience score will be lower
    c. $S_{Duration}$=Duration till Duration<OptimalDuration for that post or else $S_{Duration}$=Duration−W*(Duration/OptimalDuration) where W is a weight fixed by algorithm
  4. Network strength—How wide and deep the candidates network was within the past company.

Company Score—for Each Experience a Company Score is Calculated
  1. Company score is primarily based on Revenue, Profits, Number of employees, Other Rankings (Fortune 500)
  2. $S_{Company}=W_1*Revenue+W_2*Profits+W_3*Employees+W_4*(1/Rank)$ where W stands for weightage Skills/Competencies:
  1. Functional
    a. Skill: specific skill rating (derived from system); ranking/importance
    b. Competency: specific rating (derived from system); ranking/importance
  2. Soft/Behavioral Skills
    a. Skill: specific skill rating (derived from system); ranking/importance
    b. Competency: specific rating (derived from system); ranking/importance Location:
  1. Experience score also depends on the company work location
  2. For example working at a company headquarters/main branch adds more to the experience
  3. Location score varies from company to company and is determined by the database of company to locations mapping
  4. Along with this preference is also accounted for Similar to Other Company Employees Factor (Include or not-Specified by Recruiter Along with Weight)

The method includes determining a career path of at least one employee of a company and at least one candidate from the plurality of candidates; and comparing career paths of the at least one employee and the at least one candidate to assist the recruiter in selection of the at least one candidate for the at least one job.

Companyemployeessimilariesscore=currentnetwork membersincompany (pulled from social network)+peoplewithsimilarbackgroundcurrentlyincompany(college name, similar degree, previous same company)

Peoplewithsimilarbackgroundcurrentlyincompany—derived from data provided by company or college about current employee base (can also be derived from linkedin/socialnetwork data)

The CandidateScore is a dynamic score based on recruiter specified criteria, that is then benchmarked. Priorities are used as weights to compute a weighted average CandidateScore based on the parameters the recruiter cares about.

While there is no limit on number of parameters, needless to say weights become of limited importance if there are too many parameters/criteria selected by the recruiter.

CandidateScore=weighteducation*educationscore+ weightjobrole*jobrolescore+weightcompanyscore+weightskills*skillscore+ locationweight*locationscore+ weightsimilarityscore*companyemployeessimilaritiesscore Educationscore=matchwitheducationparametershigh+ matcheducationparametersmedium+matchwitheducationparamterslow High, medium and low weights have a derived weighted average score adding to 100%; High is always 60% of total, medium 30% and Low is 10% of score in all cases.

The recruiter also specifies relative importance of education, and skills, and job roles and relative weightage is used to assign weights in formula of CandidateScore where all weights add up to 100% and similar high, medium, and low weights are assigned.

The method includes determining a career path of at least one employee of a company and at least one candidate from the plurality of candidates; and comparing career paths of the at least one employee and the at least one candidate to assist the recruiter in selection of the at least one candidate for the at least one job.

Social/Personality Inputs:

In addition a recruiter can choose to include assessment of personality/behavior types along with analytics derived from social presence on social networks to determine the fit of the candidate with respect to the role and company.

Candidate Cost to Company

In addition the recruiter can leverage candidate's salary profile, or analytics provided on what the candidate would cost to the company based on their market value as a criteria in the fit. The recruiter could provide a range of cost they are willing to bear and candidates closer to this cost would be receiving a higher score.

Other Inputs to Algorithm are:
1. Global/Local—is the candidate working in a single country
2. Stationary/Shifting—is the candidate changing between companies frequently
3. Show overqualified candidates—Consider candidates who worked as a Senior for Junior post The recruiter may choose to include or exclude these elements from algorithm. The algorithm is dynamic allowing user to select which parameters matter.

In addition the recruiter can simply load a job description and get scores across candidates.

Once scoring of all candidates is done, the recruiter is presented with list of candidates and corresponding CandidateScore sorted according to score.

Higher candidate score implies higher likelihood of candidate getting selected and succeeding within the company.

Analytics Engine Components

As illustrated in FIG. 0, the analytics engine has the following components:
1. Database of data parsed from resumes/social network profiles put into structured format
2. Algorithm tables
3. Data sets supporting algorithms
4. Samples database
5. Benchmarking database
6. Machine Learning Elements (FIG. 3)

The system is designed to be machine learning so that every new user profile that comes into the system improves all data sets, benchmarking, algorithms, etc. Components of machine learning are discussed in relevant sections.

The database of user profiles includes the following information

| | | | | |
|---|---|---|---|---|
| FirstName | | | | |
| LastName | | | | |
| Email | | | | |
| PhoneNumber | | | | |
| Address | | | | |
| Education(Array) => | 0(Array) => | Degree | | |
| | | Field | | |
| | | SchoolName | | |
| | | LocationCity | | |
| | | LocationCountry | | |
| | | LocationString | | |
| | | Duration(In Months) | | |
| | | Grade | | |
| | | Awards(Array) => | Award0 | |
| | | | Award1 | |
| | | | Award2 | |
| | | Organizations(Array) => | Organizations0 | |
| | | | Organizations1 | |
| | | | Organizations2 | |
| | | Bullets(Array) => | BulletText0 | |
| | | | BulletText1 | |
| | | | BulletText2 | |
| Experience(Array) => | 0(Array) => | Position | | |
| | | Function | | |
| | | CompanyName | (currently as null) | |
| | | Industry | | |
| | | LocationCountry | | |
| | | LocationString | | |
| | | Duration(In Months) | | |
| | | Skills(Array) => | 0(Array) => | SkillID |
| | | | | Human Name |
| | | | | MachineName |
| | | | | SkillType{Soft,Hard} |
| | | | 1(Array) => | SkillID |
| | | | | HumanName |
| | | | | MachineName |
| | | | | SkillType{Soft,Hard} |
| | | | 2(Array) => | SkillID |
| | | | | HumanName |
| | | | | MachineName |
| | | | | SkillType{Soft,Hard} |
| | | Bullets(Array) => | BulletText0 | |
| | | | BulletText1 | |
| | | | BulletText2 | |
| | Additional | Interests(Array) => | Interest0 | |
| | | | Interest1 | |
| | | | Interest2 | |

```
Languages(Array) => Language0
                    Language1
                    Language2
Bullets(Array)   => BulletText0
                    BulletText1
                    BulletText2
```

Algorithm tables store the algorithms and formulas for each module as outlined in each section. Outputs of calculations are stored in benchmarking tables described in [0125]

The following data sets support the execution of all algorithms.
1. Resume/CV section repository
2. Action-oriented verbs database along with weights (higher for stronger action verbs, lower for weak action verbs, along with permutations of actions in tenses)
3. Avoided phrases repository
4. Passive language repository
5. Degree harmonizing database
6. Degrees to skills mapping database
7. Skills database—listing of over 10,000 skills with corresponding keywords, phrases, patterns that showcase the skills. Skills mapping to competencies.
8. Job role mapping database—job roles mapped to functions, industries with corresponding skills needed in the role, along with weights for each skill by relative importance.
9. Job role harmonization database
10. Harmonization of colleges across tiers
11. Harmonization of job roles for similarity, harmonization of functions for similarity The samples suggestions database contains the following:
1. Bullet samples tagged to industry, function, job role, skills, competencies, years of experience, education, type of experience (e.g. awards, extracurricular, etc)
2. Samples for resumes for different types of careers
3. Samples for different sections of a CV/resume e.g. objective, summary, skills sections, etc
4. Flags to suggest which stage of development they are (e.g. approved—ready for consumption by user, edit—currently being edited by writer)

The benchmarking database contains for each user their scores for all portions of algorithms including Resume Score, CareerFitScore, The database is structured such that each users attributes along with scores for each element are stored. Every new user adds to this database dynamically and this database is used to provide customized benchmarking to all users.

Benchmarking can be customized on any attribute of a user including, past college, tier of college, job role, company, years of experience, skills, competencies to show relative positioning with respect to each or a combination of these elements.

Modifications to embodiments of the present invention described in the foregoing are possible without departing from the scope of the present invention as defined by the accompanying claims. Expressions such as "including", "comprising", "incorporating", "have", "is" used to describe and claim the present invention are intended to be construed in a non-exclusive manner, namely allowing for items, components or elements not explicitly described also to be present. Reference to the singular is also to be construed to relate to the plural.

The invention claimed is:

1. A method for assessing a career profile of a candidate, the method comprising:
receiving a document representative of the career profile, wherein the document contains text arranged in accordance with a presentation structure;
parsing the document representative of the career profile to identify a parameter value for at least one parameter from a plurality of parameters within the career profile, wherein the plurality of parameters relate to the presentation structure of the document or content of the text of the document, wherein the parameter value is indicative of an extent to which the presentation structure or content of the text exhibits the at least one parameter, and wherein the plurality of parameters are pre-defined in a database and a plurality of scores are associated with each parameter;
determining, based on the parameter value for the at least one parameter, a score from the plurality of scores for the at least one parameter identified within the career profile;
determining other candidates that are similar to the candidate based on a profile vector representing one or more attributes associated with the career profile of the candidate and a plurality of profile vectors associated with the other candidates, wherein the profile vector and the plurality of profile vectors are generated by a machine learning model that has been trained to generate profile vectors based on training data (i) comprising a plurality of career profiles associated with a plurality of candidates and (ii) stored by a career analytics platform, and wherein the one or more attributes are different than the plurality of parameters;
applying at least one parameter weight to the determined score of the at least one parameter, wherein the at least one parameter weight is determined in accordance with at least one benchmark rule that is based on scores of the other candidates that are similar to the candidate;
computing a score of at least one category based on the determined score and the applied at least one parameter weight, wherein the at least one category comprises the at least one parameter identified within the career profile;
providing feedback to the candidate on the career profile in accordance with the computed score of the at least one category, wherein the feedback comprises (i) a suggested modification to the document representative of the career profile and (ii) a plurality of candidate-specific samples for executing the suggested modification, wherein each respective candidate-specific sample of the plurality of candidate-specific samples is determined to increase the score of the at least one category when added into the document representative of the career profile; and
based on providing the feedback, receiving, by way of a user interface, a selection of at least one sample of the plurality of candidate-specific samples for addition into the document representative of the career profile.

2. The method of claim 1, wherein the at least one category comprises a presentation category, an impact category, or a skill category.

3. The method of claim 2, wherein the at least one parameter comprises a margin parameter, a section layout based parameter, a section based parameter, a formatting parameter, or a spell check parameter, when the at least one category is the presentation category.

4. The method of claim 2, wherein the at least one parameter comprises a career progression based parameter, a bullet based parameter, or an achievement based parameter, when the at least one category is the impact category.

5. The method of claim 2, wherein the at least one parameter comprises a soft skills based parameter, a functional specific parameter, or an industry specific parameter, when the at least one category is the skill category.

6. The method of claim 2, further comprising:
determining an overall score of the career profile based on the computed score of the at least one category.

7. The method of claim 1, wherein the plurality of scores associated with each parameter comprises a score value of 1 when the at least one parameter is identified within the career profile and a score value of 0 when the at least one parameter is absent within the career profile.

8. The method of claim 1, further comprising uploading the career profile in the database through a user interface, automatically extracting the career profile from a proprietary database, or generating the career profile in a platform.

9. The method of claim 1, wherein the career profile comprises a private user profile, a public user profile, a resume, or a document comprising information related to a career of the candidate.

10. The method of claim 1, further comprising:
applying at least one category weight to the computed score of the at least one category, wherein the at least one category weight is determined in accordance with the at least one benchmark rule.

11. The method of claim 1, further comprising:
identifying, based on the at least one parameter, a classification of the candidate, wherein the at least one benchmarking rule is selected in accordance with the classification of the candidate.

12. The method of claim 1, further comprising:
generating a dynamic benchmarking curve in accordance with at least one peer group of the candidate; and
plotting the career profile of the candidate on the dynamic benchmarking curve.

13. The method of claim 1, wherein the suggested modification indicates to remove at least one gap within a career of the candidate.

14. The method of claim 13, wherein the plurality of candidate-specific samples are selected to remove the at least one gap, and wherein at least one candidate-specific sample of the plurality of candidate-specific samples corresponds to at least one of the parameter and the category identified within the career profile.

15. The method of claim 1, wherein the plurality of candidate-specific samples are selected for the career profile of the candidate based on one or more tags associated with the plurality of candidate-specific samples.

16. The method of claim 1, wherein providing feedback to the candidate comprises:
displaying, by way of the user interface, the feedback to the candidate in at least one of an aggregate view or a detailed view.

17. The method of claim 16, further comprising:
highlighting sections of a resume in different colours depending on a type of feedback.

18. The method of claim 6, wherein the user interface is configured to provide for editing of the career profile to increase the overall score of the career profile.

19. The method of claim 1, further comprising:
recommending at least one professional from a network of professionals in accordance with the at least one parameter, the at least one category, or the career profile.

20. The method of claim 19, further comprising:
determining a network score for each professional in the network of professionals.

21. The method of claim 1, further comprising:
identifying at least one cluster of career profiles within the database, wherein the at least one cluster comprises at least one of the parameter and category indicating at least one career path for the candidate;
determining presence of at least one skill for the candidate within the at least one cluster;
applying at least one benchmarking rule to determine score of the at least one skill of the candidate; and
computing a job fit score for the candidate based on the score of the at least one skill of the candidate.

22. The method of claim 21, further comprising:
identifying at least one job opportunity based on the job fit score of the candidate;
identifying at least one professional from a network of the candidate for the at least one job opportunity using a network score; and
computing a job fit at company score for the at least one job opportunity based on the job fit score and the network score.

23. The method of claim 22, wherein the network score is dependent on a group of members comprising members in function, members in industry, members in function in industry, members seniority in function in industry, members in HR role in industry, members in company, members in company in function, members in company in HR, or members in similar tier other companies in function.

24. The method of claim 21, further comprising:
receiving an input from the candidate regarding selection of at least one career path to be achieved within a timeframe; and
recommending to the candidate at least one action to pursue a career in the at least one career path.

25. The method of claim 1, further comprising:
receiving another career profile of the candidate;
determining synchronization between the career profiles of the candidate via matching the at least one parameter of the plurality of parameters and categories between the career profiles; and
indicating to the candidate an extent of synchronization between the career profiles of the candidate.

26. The method of claim 25, further comprising:
computing job score for at least one job for the career profiles of the candidate; and
determining a job synch score for the at least one job for the career profiles of the candidate.

27. The method of claim 1, further comprising:
receiving an input from a recruiter regarding at least one job, wherein the input comprises a job description, at least one parameter corresponding to the job description, or at least one weight for the at least one parameter;
accessing career profiles of a plurality of candidates in a resume database; and determining a job fit score of each career profile in accordance with the input of the recruiter.

28. The method of claim 27, wherein the job fit score is dependent on an education score, a job role score, a company score, a skill score, a location score, or a company employees similarities score.

29. The method of claim 27, further comprising:
determining a career path of at least one employee of a company and at least one candidate from the plurality of candidates; and
comparing career paths of the at least one employee and the at least one candidate to assist the recruiter in selection of the at least one candidate for the at least one job.

30. The method of claim 29, further comprising:
assessing behaviour of the at least one candidate using at least one social network of the at least one candidate.

31. The method of claim 29, further comprising:
accessing salary information for the at least one job; and
computing a salary range for the at least one candidate based on the job fit score and the salary information.

32. A system for assessing a career profile of a candidate, the system comprising:
a database configured to include a plurality of pre-defined parameters and a plurality of scores respective to each parameter;
a parser configured to parse a document representative of the career profile to identify within the career profile a parameter value for at least one parameter from the plurality of pre-defined parameters, wherein the document contains text arranged in accordance with a presentation structure, wherein the plurality of pre-defined parameters relate to the presentation structure of the document or content of the text of the document, and wherein the parameter value is indicative of an extent to which the presentation structure or content of the text exhibits the at least one parameter; and
an analytics engine configured to:
determine, based on the parameter value for the at least one parameter, a score from the plurality of scores for the at least one parameter identified within the career profile;
determining other candidates that are similar to the candidate based on a profile vector representing one or more attributes associated with the career profile of the candidate and a plurality of profile vectors associated with the other candidates, wherein the profile vector and the plurality of profile vectors are generated by a machine learning model that has been trained to generate profile vectors based on training data (i) comprising a plurality of career profiles associated with a plurality of candidates and (ii) stored by a career analytics platform, and wherein the one or more attributes are different than the plurality of pre-defined parameters;
apply at least one parameter weight to the determined score of the at least one parameter, wherein the at least one parameter weight is determined in accordance with at least one benchmark rule that is based on scores of the other candidates that are similar to the candidate;
compute a score of at least one category based on the determined score, wherein the at least one category comprises the at least one parameter identified within the career profile;

provide feedback to the candidate on the career profile in accordance with the computed score of the at least one category, wherein the feedback comprises (i) a suggested modification to the document representative of the career profile and (ii) a plurality of candidate-specific samples for executing the suggested modification, wherein each respective candidate-specific sample of the plurality of candidate-specific samples is determined to increase the score of the at least one category when added into the document representative of the career profile; and
based on providing the feedback, receiving, by way of a user interface, a selection of at least one sample of the plurality of candidate-specific samples for addition into the document representative of the career profile.

33. The system of claim 32, wherein the at least one category comprises a presentation category, an impact category, or a skill category.

34. The system of claim 33, wherein the at least one parameter comprises a margin parameter, a section layout based parameter, a section based parameter, a formatting parameter, or a spell check parameter, when the at least one category is the presentation category.

35. The system of claim 33, wherein the at least one parameter comprises a career progression based parameter, a bullet based parameter, or an achievement based parameter, when the at least one category is the impact category.

36. The system of claim 33, wherein the at least one parameter comprises a soft skills based parameter, a functional specific parameter, or an industry specific parameter, when the at least one category is the skill category.

37. The system of claim 32, further comprising a career fit module, wherein the career fit module is configured to:
identify at least one cluster of career profiles within the database, wherein the at least one cluster comprises at least one of the parameter and category indicating at least one career path for the candidate;
determine presence of at least one skill for the candidate within the at least one cluster;
apply at least one benchmarking rule to determine score of the at least one skill of the candidate; and
compute a job fit score for the candidate based on the score of the at least one skill of the candidate.

38. The system of claim 32, further comprising a synchronization module configured to:
receive another career profile of the candidate;
determine synchronization between the career profiles of the candidate via matching the at least one parameter of the plurality of pre-defined parameters and categories between the career profiles; and
indicate to the candidate an extent of synchronization between the career profiles of the candidate.

39. The system of claim 32, further comprising a candidate scoring module configured to:
receive an input from a recruiter regarding at least one job, wherein the input comprises a job description, at least one parameter corresponding to the job description, or at least one weight for the at least one parameter;
access career profiles of a plurality of candidates in a resume database; and
determine a job fit score of each career profile in accordance with the input of the recruiter.

* * * * *